United States Patent
Lopez et al.

(10) Patent No.: US 11,377,382 B2
(45) Date of Patent: Jul. 5, 2022

(54) DEVICE AND METHOD FOR MANUFACTURING A HOLLOW GLASS ARTICLE BY CONTROLLED BLOWING

(71) Applicant: POCHET DU COURVAL, Clichy (FR)

(72) Inventors: Antoine Lopez, Abbeville (FR); Marc Pruvost, Lille (FR)

(73) Assignee: POCHET DU COURVAL, Clichy (FR)

(*) Notice: Subject to any disclaimer, the term of this patent is extended or adjusted under 35 U.S.C. 154(b) by 358 days.

(21) Appl. No.: 16/396,374

(22) Filed: Apr. 26, 2019

(65) Prior Publication Data
US 2019/0330093 A1 Oct. 31, 2019

(30) Foreign Application Priority Data
Apr. 27, 2018 (FR) ..................... 18 53732

(51) Int. Cl.
*C03B 9/41* (2006.01)
*C03B 9/347* (2006.01)
*C03B 9/36* (2006.01)

(52) U.S. Cl.
CPC ............. *C03B 9/41* (2013.01); *C03B 9/347* (2013.01); *C03B 9/3636* (2013.01); *C03B 9/3672* (2013.01)

(58) Field of Classification Search
None
See application file for complete search history.

(56) References Cited

U.S. PATENT DOCUMENTS

| | | | |
|---|---|---|---|
| 4,708,730 A * | 11/1987 | Ziegler | C03B 9/3609 65/114 |
| 6,401,491 B1 * | 6/2002 | Wacke | C03B 9/385 65/301 |
| 2003/0101767 A1 * | 6/2003 | Hyre | C03B 9/3681 65/261 |
| 2015/0013387 A1 | 1/2015 | Borcherding et al. | |
| 2015/0210582 A1 | 7/2015 | Mayeu et al. | |

FOREIGN PATENT DOCUMENTS

| | | | | |
|---|---|---|---|---|
| FR | 2 993 879 | | 1/2014 | |
| GB | 2297548 A | * | 8/1996 | C03B 9/3627 |

OTHER PUBLICATIONS

French Search Report, FR 1853732, dated Jan. 21, 2019.

* cited by examiner

*Primary Examiner* — Erin Snelting
(74) *Attorney, Agent, or Firm* — Nixon & Vanderhye

(57) ABSTRACT

Device for forming a glass article, including a forming mold for receiving a glass blank, and a gas injection device with a blowing head intended to be received in the mouth of the blank, the gas injection device including a pressurized gas inlet, a first injection channel connecting the pressurized gas inlet to at least one outlet port opening into the inside cavity, through a first control solenoid valve, with a first pressure sensor and a first temperature sensor, a vent channel connecting the inside cavity to the outside air, the vent channel being equipped with a second pressure sensor and a second temperature sensor, an electro-pneumatic control unit being configured to control the first control solenoid valve according to the pressure measurements and temperature measurements.

22 Claims, 8 Drawing Sheets

Key: Plongée = Insertion

Key:

Temps = Time    Pression = Pressure

DEVICE AND METHOD FOR MANUFACTURING A HOLLOW GLASS ARTICLE BY CONTROLLED BLOWING

TECHNICAL FIELD

The invention relates to a device and a method for manufacturing a hollow glass article. Of particular interest are articles that are of the bottle or pot type, particularly those intended to contain cosmetic products or perfume products.

CONTEXT AND PRIOR ART

It is known to form a blank of the article to be formed by using a parison, then introducing this blank of the article into a finishing mold, and proceeding with a blowing operation inside the blank in the finishing mold in order to obtain the article to be formed, by the injection of at least one gas inside the blank of the article at a forming pressure.

FR2993879 teaches introducing a blowing nozzle inside the blank and providing a vent channel to allow gas to flow out simultaneously with the injection of gas in the nozzle. However, it has been found that the repeatability of this method is fairly difficult to control, especially if multiple molding cavities are used in parallel, in particular supplied by a common compressed air manifold.

SUMMARY OF THE INVENTION

For this purpose, a device is provided for forming a glass article (92), comprising:
 a forming mold (2) for receiving a glass blank (91) intended to become the glass article,
 a gas injection device (10) with a blowing head (3) intended for propelling gas into the cavity inside the blank, and intended to be received in the mouth (19) of the blank having a main axis (A), the gas injection device comprising an air circuit with:
  a pressurized gas inlet PS,
  an injection channel (C1) connecting the pressurized gas inlet to at least one outlet port (31) opening into the cavity inside the blank, through a first control solenoid valve (81),
  a vent channel (C2) connecting the inside cavity to an outlet (35) to the outside air,
 at least a first pressure sensor (P1 or P2) and a first temperature sensor (T1 or T2) both arranged on the air circuit between the first control solenoid valve and the outlet (35) to the outside air,
 an electro-pneumatic control unit (8) configured to control the first control solenoid valve (81) according to the pressure measurements read by the first pressure sensor (P1 or P2) and the temperature measurements read by the first temperature sensor (T1 or T2),
so that the aeraulic conditions of the flow of gas in the cavity can be known and the device can thus control the first control solenoid valve (81) according to predetermined aeraulic criteria.

With these arrangements, it is possible to control the pressure profile applied at the core of the blank. The injection pressure is adjusted to an optimum value, regardless of possible variations upstream in the common compressed air manifold. The pressure and temperature values enable estimating the instantaneous flow of air passing through the cavity of the blank, in particular the mass flow rate of air; it is thus possible to control the flow rate of the blowing sequence. Better control of the pushing of the glass towards the walls of the mold becomes possible, and the cooling of the glass and the decrease in malleability of the glass during the blowing operation is better accommodated and spreading between neighboring molds is avoided.

In various embodiments of the invention, one or more of the following arrangements, in isolation or in combination, may possibly also be employed.

In one aspect, it is provided that the first pressure sensor (P2) and the first temperature sensor (T2) are referred to as downstream sensors and are arranged on the vent channel (C2). The pressure and temperature conditions prevailing in the vent channel make it possible to calculate the mass flow rate of air passing through the cavity of the blank, and this estimate is more precise when the venting to the outside air can be done through a restrictor.

According to an optional aspect, further provided are a second pressure sensor (P1) and a second temperature sensor (T1), referred to as upstream sensors and arranged on the injection channel (C1), and the electro-pneumatic control unit (8) configured to control the first control solenoid valve (81) according to the pressure measurements read by the upstream and downstream pressure sensors (P1, P2) and the temperature measurements read by the upstream and downstream temperature sensors (T1, T2). This makes it possible to fine-tune the mass flow rate of the air passing through the cavity of the blank.

According to an optional aspect, a downstream buffer cavity (33) in the vent channel (C2) is provided in the blowing head, at the location where the information from the first pressure sensor (P2) and first temperature sensor (T2) is captured. In this manner, the pressure and temperature in the vent channel of the blank can be reliably measured, the measurements having little or no interference from the dynamic aspects of the flow.

According to a variant aspect, it is provided that the first pressure sensor (P1) and the first temperature sensor (T1) are referred to as upstream sensors and are arranged on the injection channel (C1). The pressure and temperature conditions prevailing in the injection channel make it possible to calculate the mass flow rate of air passing through the cavity of the blank.

According to an advantageous aspect, further provided are a second pressure sensor (P2) and a second temperature sensor (T2), referred to as downstream sensors and arranged on the vent channel (C2), and the electro-pneumatic control unit (8) configured to control the first control solenoid valve (81) according to the pressure measurements read by the upstream and downstream pressure sensors (P1, P2) and the temperature measurements read by the upstream and downstream temperature sensors (T1, T2). This makes it possible to fine-tune the mass flow rate of air passing through the cavity of the blank.

According to an advantageous aspect, a buffer cavity (30) is provided in the path of the first injection channel (C1), in the blowing head, at the location where the information from the first pressure sensor (P1) and first temperature sensor (T1) is captured. In this manner, the pressure and the temperature can be reliably measured as close as possible to the nozzle outlet port opening into the blank, these measurements having little or no interference from the dynamic aspects of the flow.

According to an advantageous aspect, the first control solenoid valve (81) can be controlled as a function of predetermined aeraulic criteria and also as a function of time, in order to obtain a particular desired internal shape (95) for the glass article being formed.

In this manner the pressure profile works together with the drop in temperature induced by blowing and therefore with the reduction in malleability of the glass of the blank, to push the material towards the walls of the mold, and this occurs in a differentiated manner for the different portions of the article. By controlling the pressure over time, it is possible to control the mass flow rate of the blown air and in particular to obtain differentiated thicknesses of material in different areas of the glass article. The inside of the bottle can thus be "sculpted" to give it an interior volume of specific and pleasing aesthetics.

According to an optional aspect, the vent channel (C2) may comprise, between the inside cavity and the outlet (35) to the outside air, a restrictor (84) forming a predefined pressure drop. This forms a simple and reliable solution for reducing the capacity for air flow towards the outside air and thus for controlling the blowing over time during the blowing operation.

According to an alternative option, the vent channel (C2) comprises a second control solenoid valve (82), between the inside cavity and the outside air.

The vent pressure can thus be well controlled, regardless of the external conditions and regardless of the pressure upstream of the cavity.

According to an optional aspect, at least one outlet port is off-axis, namely with at least one jet axis (W) directed away from the main axis A. In this manner the blowing can thus be made asymmetrical, and an asymmetrical shape for the inside cavity can be obtained, with for example a greater glass thickness on the opposite side to the jet axis W. It is thus possible to obtain interior glass distributions that are quite different from the standard distributions known in the art under the terms "marloquette" or "policeman's hat" model, "teardrop" model, and "flat" model.

According to an optional aspect, the blowing head comprises a pipette (4) in which at least one pressurized gas outlet port is arranged. The pipette thus makes it possible to direct the flow of gas and to precisely position the outlet port with respect to the blank.

According to an optional aspect, the pipette may be movable in translation along the main axis A. Thus, the position of the outlet port (or outlet ports if there are several) can be inside the blank after downward translation (or 'insertion'). It may also be provided that the position of the outlet port can be changed during the blowing operation.

Similarly, the height of the outlet port for blowing can be chosen according to the glass article to be obtained, in particular the desired interior volume.

According to an optional aspect, the pipette may be rotatable about the main axis A. In this manner it is possible to change the position of the outlet port (or outlet ports if there are several) during the blowing operation. Similarly, the angular position of the outlet port for blowing can be chosen according to the glass article to be obtained, in particular the desired interior volume.

According to an optional aspect, there may be a plurality of outlet ports (31A-31D) at the lower end of the pipette. In this manner the jet from each port can push the glass more efficiently at the locations where such is required in order to obtain the glass article desired, in particular the desired interior volume.

According to an optional aspect, the glass article is a bottle or pot. For glass articles containing cosmetic or perfume products, the method and device make it possible to obtain articles with very particular designs, in particular with a very particular interior volume of the container, asymmetrical, rippled, etc., to obtain an extraordinary aesthetic appearance.

In an optional aspect, the glass article has a rectangular bottle exterior cross-section, or an oval exterior cross-section, or a round exterior cross-section. The proposed method and the proposed device can be used regardless of the outer shapes of the desired articles.

According to an optional aspect, the vent path is arranged annularly around the injection path (FIG. 9B). This forms a compact and optimized solution for a circular mouth; the injection channel and the vent channel are thus housed in a compact manner in the mouth on which the blowing head is fitted, even when the mouth is narrow.

According to an optional aspect, the forming mold (2) exhibits a main die having two halves (21,22) and a removable bottom (23). It is thus easy to unmold the glass article once the blowing operation is complete.

The invention also relates to a method for forming a glass article by blowing into a forming mold, the method comprising the steps of:
injecting into an inside cavity of a blank, via a first control solenoid valve (81), a pressurized gas via an injection channel (C1) connecting a pressurized gas inlet to at least one outlet port (31) opening into the inside cavity of the blank, with an air circuit further comprising a vent channel (C2) connecting the inside cavity to an outlet (35) to the outside air,
simultaneously measuring a first pressure (P1 or P2) and a first temperature (T1 or T2) on the air circuit between the first control solenoid valve and the outlet (35) to the outside air,
controlling the first control solenoid valve (81) according to the pressure and temperature measurements read by the first pressure sensor (P1 or P2) and first temperature sensor (T1 or T2), so that the aeraulic conditions of the flow of gas in the cavity can be known and the device can thus control the first control solenoid valve according to predetermined aeraulic criteria.

According to an optional aspect, the method provides for:
simultaneously measuring the first pressure (P2) and the first temperature (T2) prevailing in the vent channel (C2). The pressure and temperature conditions prevailing in the vent channel can be used to calculate the mass flow rate of air passing through the cavity of the blank, and this estimate is all the more precise when the outlet to the outside air has a restrictor.

According to an optional aspect, the method provides for:
simultaneously measuring a second pressure (P1) and a second temperature (T1) prevailing in the injection channel (C1),
controlling the first control solenoid valve (81) according to the pressure measurements read by the upstream and downstream pressure sensors (P1, P2) and the temperature measurements read by the upstream and downstream temperature sensors (T1, T2). In this manner, the knowledge of the pressure and temperature conditions both upstream and downstream of the blank makes it possible to calculate the air flow rate more precisely and to control the blowing according to the mass flow rate of the air injected into the blank during the blowing sequence.

According to an optional aspect, the method provides for:
simultaneously measuring the first pressure (P1) and the first temperature (T1) prevailing in the injection channel (C1). The pressure and temperature conditions prevailing in the injection channel can be used to calculate the mass flow rate of air passing through the cavity of the blank.

According to an optional aspect, the method provides for:
simultaneously measuring a second pressure (P2) and a second temperature (T2) prevailing in the vent channel (C2),
controlling the first control solenoid valve (81) according to the pressure measurements read by the first and second pressure sensors (P1, P2) and the temperature measurements read by the first and second temperature sensors (T1, T2). In this manner, the knowledge of the pressure and temperature conditions both upstream and downstream of the blank makes it possible to calculate the air flow rate more precisely and to control the blowing in accordance with the mass flow rate of the air injected into the blank during the blowing sequence.

According to an optional aspect, the flow in the vent channel (C2) can be controlled by means of a second control solenoid valve (82); the vent pressure can thus be well controlled, regardless of the external conditions and regardless of the pressure upstream of the cavity.

According to an optional aspect, the first control solenoid valve (81) can be controlled as a function of predetermined aeraulic criteria and also as a function of time, in order to obtain a particular desired internal shape (95) for the glass article being formed. By controlling the pressure over time, it is possible in particular to obtain differentiated thicknesses of material in different areas of the glass article. The interior of the bottle can thus be "sculpted" to give it an interior volume of pleasing aesthetics.

DESCRIPTION OF FIGURES

Other aspects, objects, and advantages of the invention will be apparent from reading the following description of an embodiment of the invention, given as a non-limiting example. The invention will also be better understood by referring to the accompanying drawings in which.

DETAILED DESCRIPTION

In the different figures, the same references designate identical or similar elements. For the sake of clarity, some elements are not necessarily represented to scale.

Figure 1:
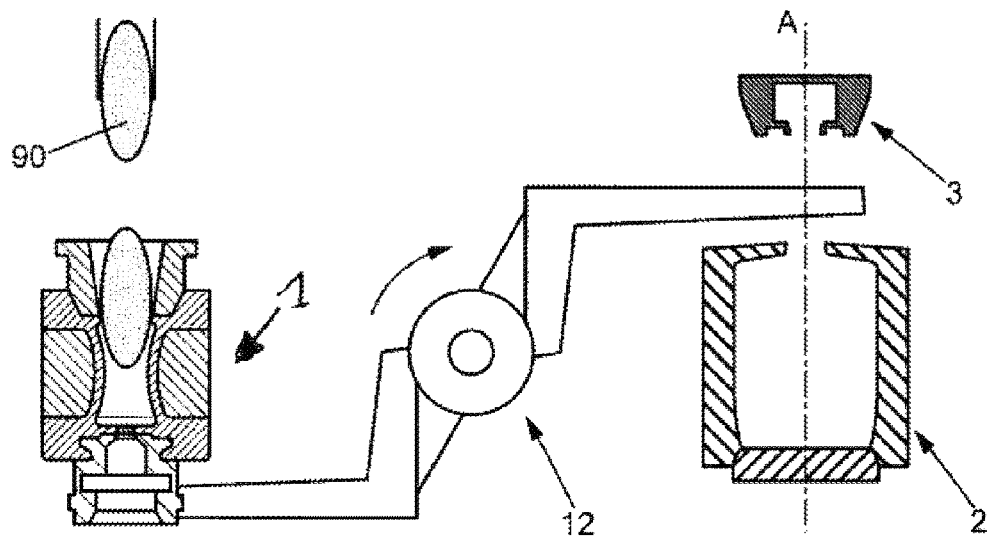
FIG. 1 schematically represents a facility for forming a glass article, implemented within the general context of the present invention, FIG. 2 schematically represents the introduction of the blank into the forming mold.
Figure 2:
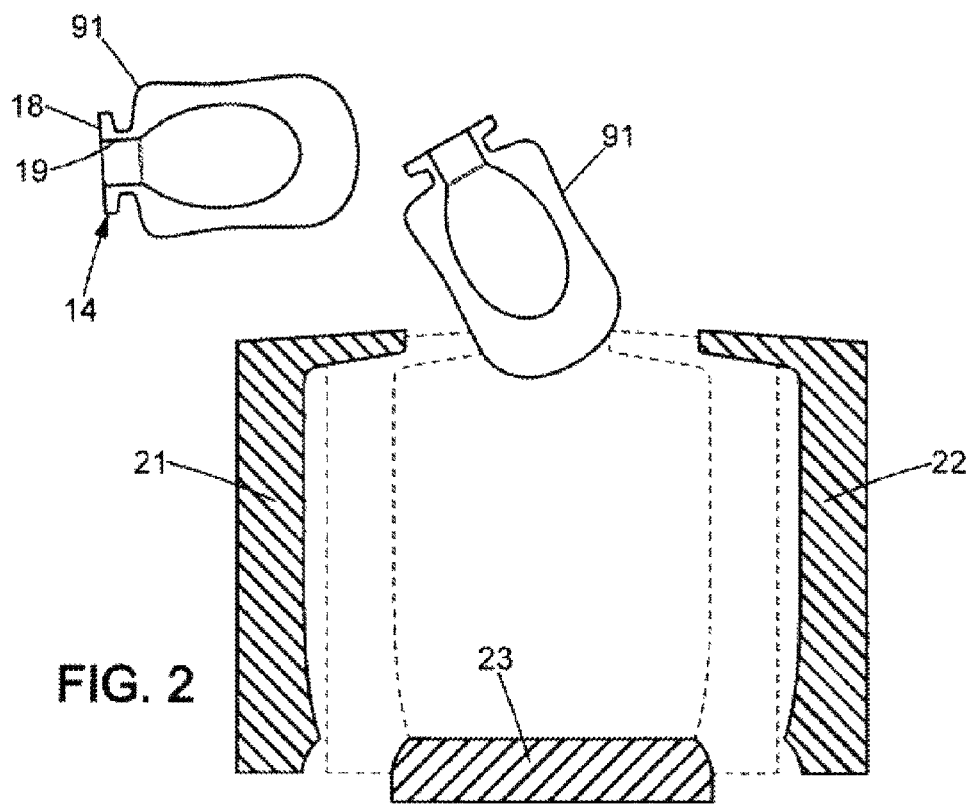

FIGS. 1 and 2 show a general view of a facility for forming a hollow glass article within the general scope of the invention.

The installation comprises a blank mold 1 and a finishing mold 2. A manipulator 12 is used to transfer a blank out of the blank mold 1 and towards the finishing mold 2.

As is known per se and is therefore not described in detail here, a calibrated gob 90 of molten glass (called 'parison' in the art) is deposited in a blank mold 1.

In the illustrated example, compressed air is blown in the gob of molten glass to shape it within the cavity of the blank mold and thus form a blank 91. Alternatively, a pusher could be used to form a blank 91. The blank 91 is also called a 'preform'.

Note that the ring 14 is formed in the blank mold 1.

The ring area comprises a mouth 19 and a neck 18.

After this first preforming step, the blank 91 is transferred via the manipulator arm 12 to the finishing mold, also referred to herein as the forming mold 2.

We will now focus on the proposed device which contains, in addition to the abovementioned forming mold 2, a gas injection device 10 and a control unit 8 which will both be detailed below.

The gas injection device comprises a blowing head 3 for propelling gas into the cavity inside the blank 91.

The blowing head 3 is configured to be received in the mouth 19 of the blank having an axis A. After placement of the preform, the blowing head 3 is lowered to be fitted onto the mouth 19 of the blank 91.

One will note that the lower portion of the blowing head has a shape that is complementary to the shape of the ring; this provides a continuous contact that is substantially airtight at this location.

Figure 4:
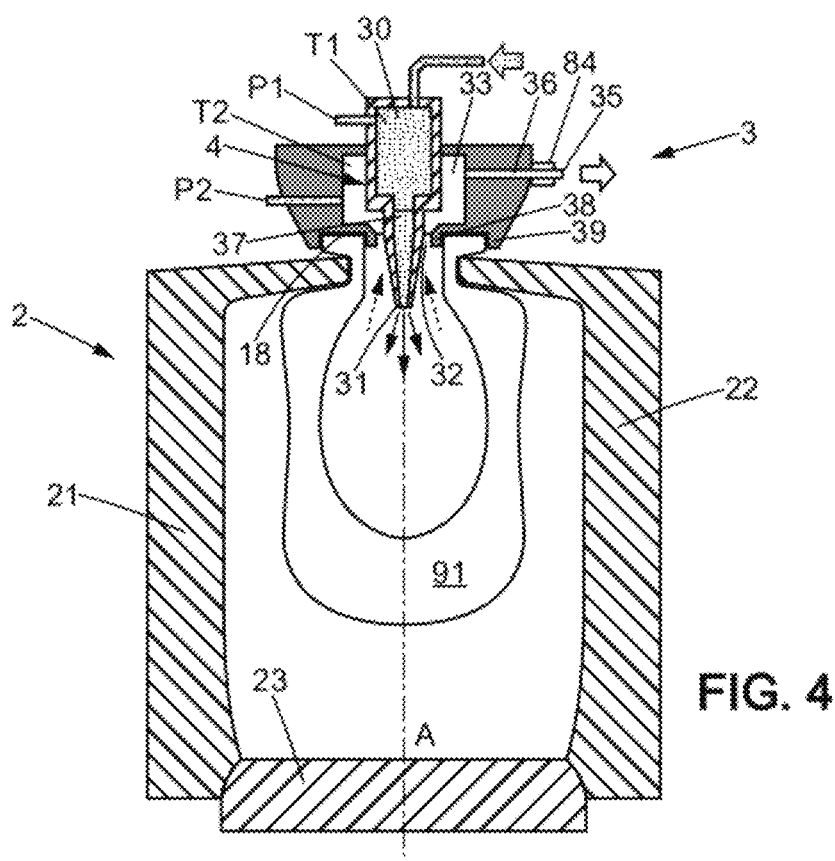
FIG. 4 schematically illustrates a section view of the blowing device placed on the blank in the mold, FIG. 5 schematically represents a section view of the blank in the mold before the actual blowing, according to a first variant of the glass bottle to be produced.

A centering flange internal to the mouth may be provided in the blowing head, denoted by the reference 38 in FIG. 4. In addition or alternatively, the centering may also be done on the outside of the ring by an annular projection 39 (FIG. 4). In another configuration illustrated further on, centering is not necessary, as the fit presses flatly against it.

In the illustrated example, the gas used is pressurized air. However, the use of another gas is not excluded in certain applications of the present invention, for example a chemically inert gas.

Figure 3:
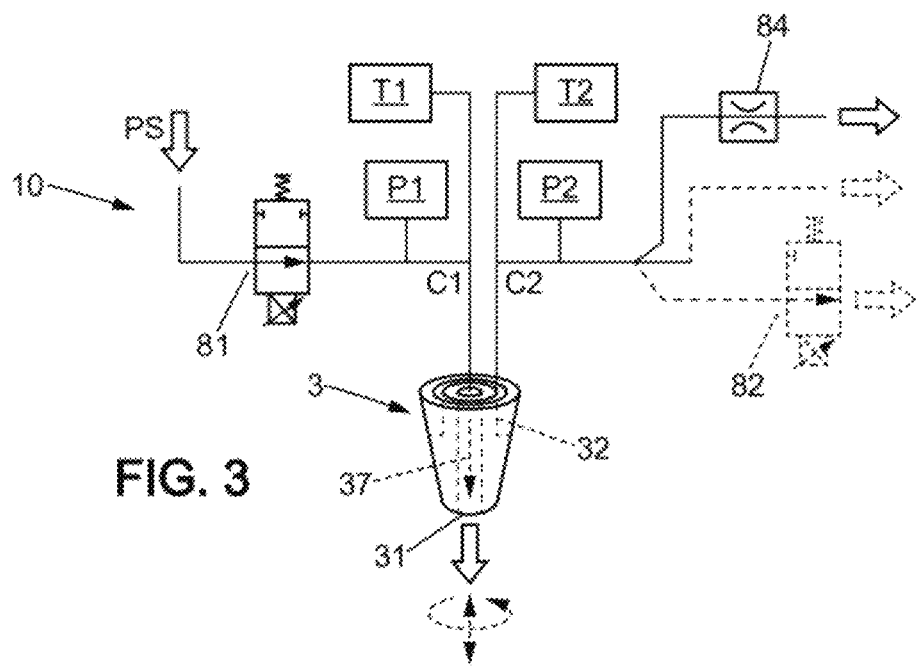
FIG. 3 illustrates a pneumatic diagram according to a first embodiment.

As is generically illustrated in FIG. 3, the gas injection device comprises a pressurized gas inlet PS, and a first injection channel C1 connecting the pressurized gas inlet to at least one outlet port 31 that opens into the cavity inside the blank.

According to an optional configuration, a pressure sensor P1 referred to as "upstream" and a temperature sensor T1 referred to as "upstream" may be provided on the first injection channel.

The outlet port 31 opens into the cavity inside the blank, but the blown air travels upstream through a first control solenoid valve 81. Several outlet ports may be provided, as will be seen below.

The upstream pressure sensor P1 and the upstream temperature sensor T1 are arranged on a portion of the first channel between the first control solenoid valve 81 and the outlet port 31. Preferably, the upstream temperature sensor T1 comprises a sensitive portion located downstream of the air intake provided for the upstream pressure sensor P1, preferably not far from where the gas arrives at the outlet port 31.

The blowing head 3 further comprises a vent channel C2 connecting the inside cavity to an outlet 35 to the outside air via a vent passage denoted 32.

According to an optional configuration, the vent channel C2 may be equipped with a pressure sensor P2 referred to as "downstream" and a temperature sensor T2 referred to as "downstream".

Preferably, the downstream temperature sensor T2 comprises a sensitive portion located upstream of the air intake provided for the downstream pressure sensor P2, preferably not far from the gas vent from the cavity.

In this case, with only the downstream temperature sensor T2 and the downstream pressure sensor P2, the electro-pneumatic control unit 8 is configured to control the first control solenoid valve 81 according to the pressure measurements read by the first and second pressure sensors (P1, P2).

Thus, P and T (pressure and temperature) may be captured upstream only, or downstream only, or even both upstream and downstream.

The "first" pressure sensor is the main pressure sensor, in other words either the upstream pressure sensor P1 or the downstream pressure sensor P2 depending on the presence of one or the other.

The "first" temperature sensor is the main temperature sensor, in other words either the upstream temperature sensor T1 or the downstream temperature sensor T2 depending on the presence of one or the other.

In other words, the pair of main sensors is either the pair P1, T1 or the pair P2, T2.

The "second" pressure and temperature sensors are the pair of auxiliary sensors supplementing the pair of main sensors called the "first" sensors; the second sensors may be either the pair P1, T1 or the pair P2, T2 depending on the presence of one or the other as the main sensors.

One will therefore note that the blowing head can be said to be instrumented, since it comprises at least one pair [temperature sensor+pressure sensor] which collects this information in a buffer chamber of the blowing head (either upstream or downstream of the inside cavity of the blank).

According to one particular option, the vent channel C2 may comprise, between the inside cavity and the outside air 35, a second control solenoid valve 82.

According to an alternative, the vent channel may lead directly to the outside air 35.

According to another alternative, the vent channel C2 comprises, between the inside cavity and the outlet 35 to the outside air, a restrictor 84 forming a predefined pneumatic pressure drop. It is thus possible to limit the flow rate at the outlet and to blow in the cavity with an internal pressure greater than the pressure that prevails when there is unrestricted venting to the outside air 35, but less than a quarter of the blowing without venting.

As illustrated in FIG. 4, the gas injection device 10 comprises, at the core of the blowing head, a pipette denoted 4. This pipette may also be called a "nozzle". This pipette receives the supply of pressurized gas from the control solenoid valve, via a pneumatic connection. This pneumatic connection is preferably located in the upper portion of the pipette, in other words not far from the main axis of the mold.

The first channel C1 comprises a buffer cavity or buffer chamber 30 (buffer cavity upstream of the blank), at the location of the temperature measurement (sensor T1) as well as the pressure measurement of the first pressure sensor P1.

Forming a ring around the pipette, a vent passage 32 is located in the lower portion and a vent chamber 33 in the upper portion.

The second vent channel C2 thus comprises a buffer chamber 33 at the location of the second temperature measurement (sensor T2) as well as the pressure measurement of the second pressure sensor P2. Buffer chamber 33 is likewise called 'vent chamber' or 'rest chamber'.

A radial channel 36 connects the vent chamber 33 either to the second control solenoid valve 82 or to the restrictor 84 or directly to the outside air depending on the various possible configurations.

In a first example, an outlet port 31 is provided at the lower end of the pipette; a feed channel 37 connects buffer chamber 33 to this outlet port 31. The feed channel 37 may have a truncated conical cross-section, growing smaller as it approaches the outlet port.

In a basic version, the electro-pneumatic control unit 8 is configured to control the first control solenoid valve 81 according to the pressure measurements read by the first pressure sensor P1 and the temperature measurements read by the first temperature sensor T1.

If the vent channel C2 is equipped with a pressure and temperature sensor, then the electro-pneumatic control unit 8 is configured to control the first control solenoid valve 81 according to the pressure measurements read by the first and second pressure sensors (P1, P2) and the temperature measurements read by the first and second temperature sensors (T1, T2).

When the device further includes a solenoid valve at the outlet, then the electromagnetic control unit is also configured to control the second control solenoid valve 82.

The first control solenoid valve 81 is controlled according to a pressure setpoint.

The pressure set point is chosen between a minimum pressure substantially equal to 1 bar and a maximum pressure substantially equal to 7 bar.

Advantageously, controlling the control solenoid valve to blow at setpoint pressures makes it possible to eliminate any pressure variations upstream, particularly in the compressed air manifold shared by a plurality of identical molds.

The first control solenoid valve 81 is controlled according to predetermined aeraulic criteria so as to obtain a particular desired inner shape 95 for the glass article being formed.

Optionally, the first control solenoid valve 81 is controlled as a function of predetermined aeraulic criteria and in addition as a function of time.

The fluid used here (air) is compressible. The flow of air in the blowing system is governed by physical equations which include the Saint Venant relation:

$$1 + \frac{\gamma+1}{2}M^2 = \frac{T_i}{T} = \left(\frac{\rho_i}{\rho}\right)^{\gamma-1} = \left(\frac{P_i}{P}\right)^{\frac{\gamma-1}{\gamma}} \quad \text{(Equation A)}$$

$\gamma$ is the ratio of the specific heat capacities at constant pressure and volume; $\gamma = Cp/Cv$; $\gamma$ is the adiabatic index of a gas, also called the Laplace coefficient.

$\gamma$ is within the range of 1.35 to 1.45 for air, often close to 1.405 at low altitude with the standard composition of air.

M represents the flow velocity expressed as a Mach number.

$\rho$ and $\rho_i$ represent the volumetric mass density.

We can therefore calculate the mass flow rate, which has the formula:

$$Q_m = \rho S \sqrt{\frac{2\gamma}{\gamma-1}\frac{P_i}{\rho_i}\left[1-\left(\frac{P}{P_i}\right)^{\frac{\gamma-1}{\gamma}}\right]}$$

If we summarize the two unknowns they are $\rho$ and $\rho_i$.

However, the volumetric mass density is expressed as a function of the pressure and temperature at a given point, by:

$$\rho_i = \frac{P_i V}{RT_i}$$

and according to the Saint Venant equations $$\rho = \rho_i \left(\frac{P}{P_i}\right)^{\frac{1}{\gamma}}$$

Therefore the mass flow rate is written as follows:

$$Q_m = \rho_i \left(\frac{P}{P_i}\right)^{\frac{1}{\gamma}} S \sqrt{\frac{2\gamma}{\gamma-1}\frac{P_i}{\rho_i}\left[1-\left(\frac{P}{P_i}\right)^{\frac{\gamma-1}{\gamma}}\right]} \quad \text{(Equation 1)}$$

The quantities defined by the index i are called "generator quantities" which correspond to the rest state of the fluid when the velocity is zero.

In the present case, the generating quantities can be considered to be present in the rest chamber 33 of the head on the vent side just before the outlet port, namely P2 and T2.

We have the prevailing pressure and temperature P1 and T1 in the injection channel C1 of the head, in particular at the injection buffer chamber 30.

The vent-side outlet port leads to the outside air where P=Patm.

We apply the above formula for the mass flow rate with P=Patmo and with either Pi=P1 or Pi=P2, depending on whether the pair of main sensors is the pair P1, T1 or the pair P2, T2.

If we only have P2, T2, then:

$$Q_m = \rho_i \left(\frac{Patmo}{P2}\right)^{\frac{1}{\gamma}} S \sqrt{\frac{2\gamma}{\gamma-1}\frac{P1}{P_i}\left[1-\left(\frac{Patmo}{P2}\right)^{\frac{\gamma-1}{\gamma}}\right]} \quad \text{(Equation 2)}$$

If we only have P1, T1, then by taking into account a pressure drop WP at the injection nozzle:

$$Q_m = \rho_i \left(\frac{Patmo}{P2}\right)^{\frac{1}{\gamma}} S \sqrt{\frac{2\gamma}{\gamma-1}\frac{P1}{P_i}\left[1-\left(\frac{Patmo}{P1-WP}\right)^{\frac{\gamma-1}{\gamma}}\right]} \quad \text{(Equation 3)}$$

If we have the combination of P1, T1 and P2, T2, we can evaluate an auxiliary quantity:

$$Q_m = \rho_i \left(\frac{Patmo}{P2}\right)^{\frac{1}{\gamma}} S \sqrt{\frac{2\gamma}{\gamma-1}\frac{P1}{P_i}\left[1-\left(\frac{P2}{P1}\right)^{\frac{\gamma-1}{\gamma}}\right]} \quad \text{(Equation 4)}$$

Figure 10:
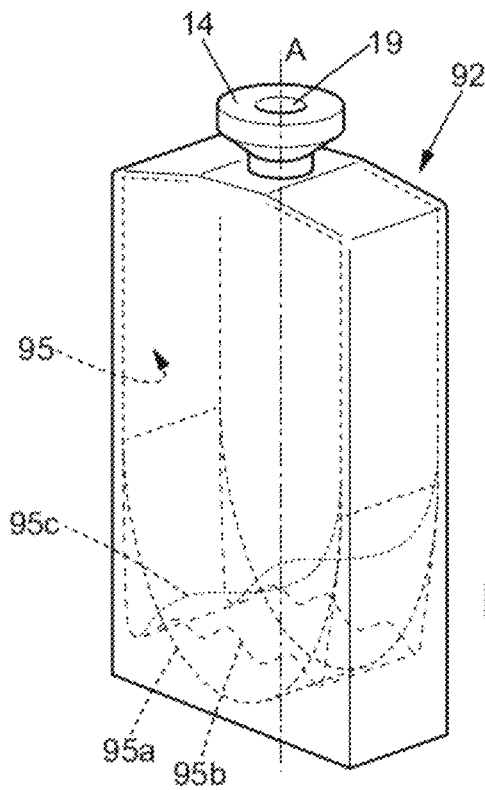
FIG. 10 illustrates different bottle variants that can be obtained.

The hollow article 92 to be obtained is for example a bottle of a general parallelepipedal shape, comprising the ring 14 with a port having an inside diameter that is preferably between 3 mm and 13 mm, as shown in FIG. 10.

The hollow article is characterized by an "internal distribution of glass". "Internal distribution of glass" is understood to mean a particular shape of the inner wall of the bottle due to a variation in the thickness of the glass 94 between the outer wall and the inner wall of the bottle.

Advantageously, the hollow article has a specific internal distribution of glass which is non-trivial and impossible to obtain by simple conventional blowing.

Advantageously, a perfume bottle can be manufactured that has an effective internal volume between 2 ml and 500 ml, most often between 10 ml and 200 ml.

In the finished article, the volume occupied by the glass itself may be between 10% and 30% of the total volume of the bottle. This high proportion of glass makes it possible to have a heavy and weighty bottle that implies and emphasizes the quality of the product it contains. In the most common perfume bottles targeted by the method, the effective internal volume of the bottle is between 20 ml and 100 ml.

In a variant not shown, the hollow article may be a round pot, for example for a cosmetic cream. The pot has for example an internal diameter of less than 105 mm.

In a variant not shown, it is also possible to apply the method according to the invention to blowing a beverage bottle.

Figure 5:
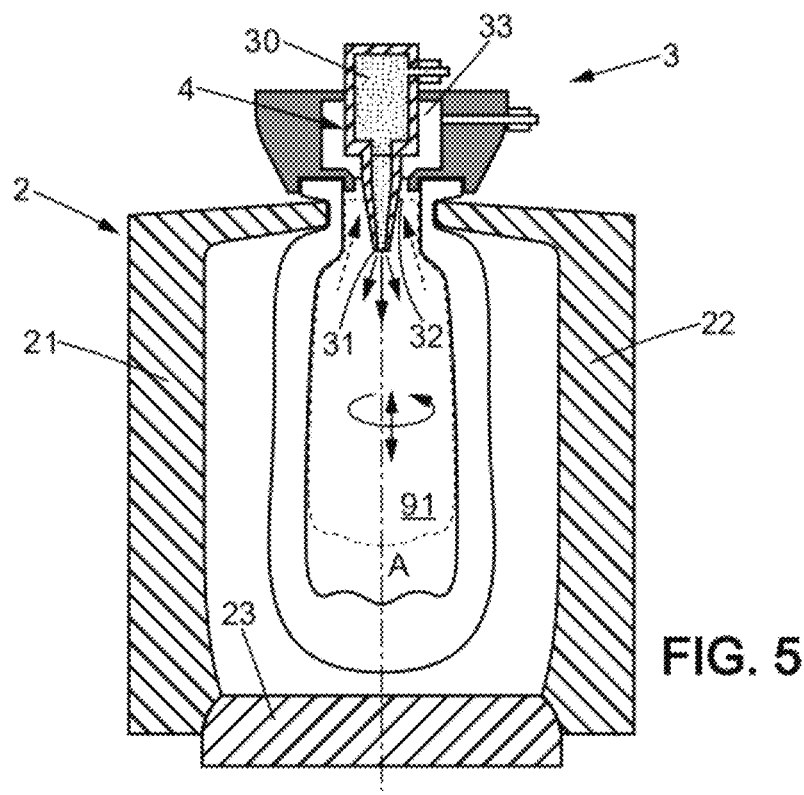
Figure 6:
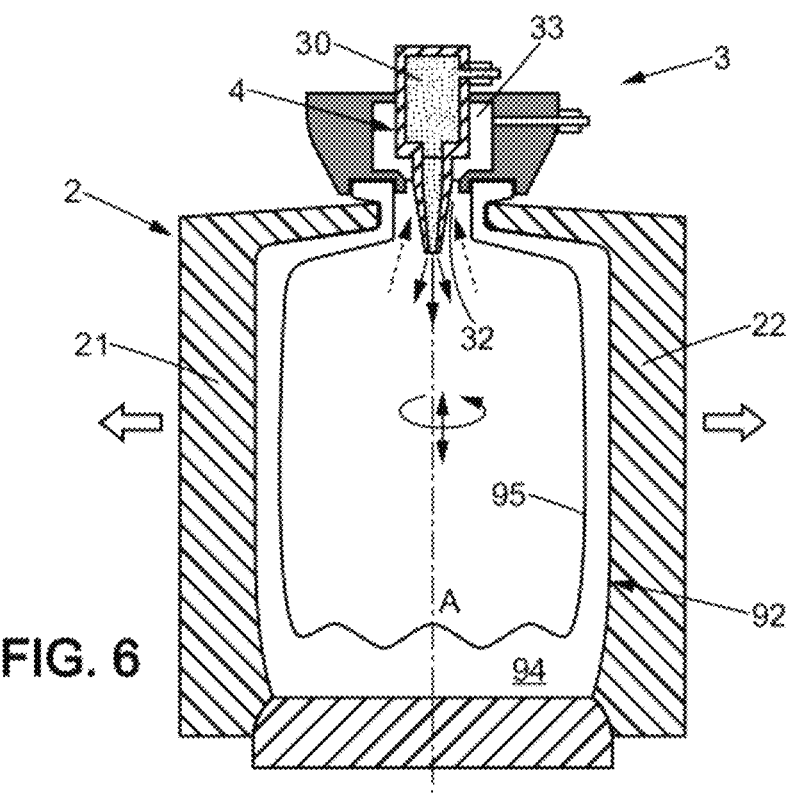
FIG. 6 is similar to FIG. 5, but after the blowing sequence and before the mold is opened, FIG. 7 schematically represents a section view of the blank in the mold before the actual blowing, according to a second variant of the glass bottle to be produced.

FIGS. 5 and 6 illustrate the use of the method for forming a bottle with an interior volume 95 having a wavy base. According to this example, a wave effect is created in the bottom 92 of the bottle by controlling the gas ejection velocity.

Figure 7:
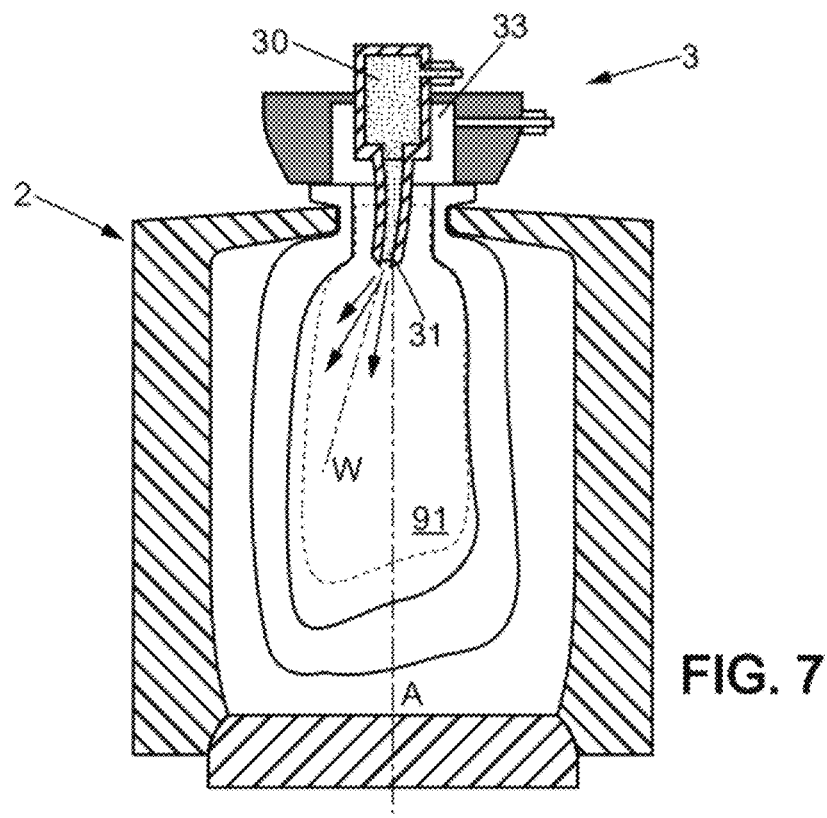
Figure 8:
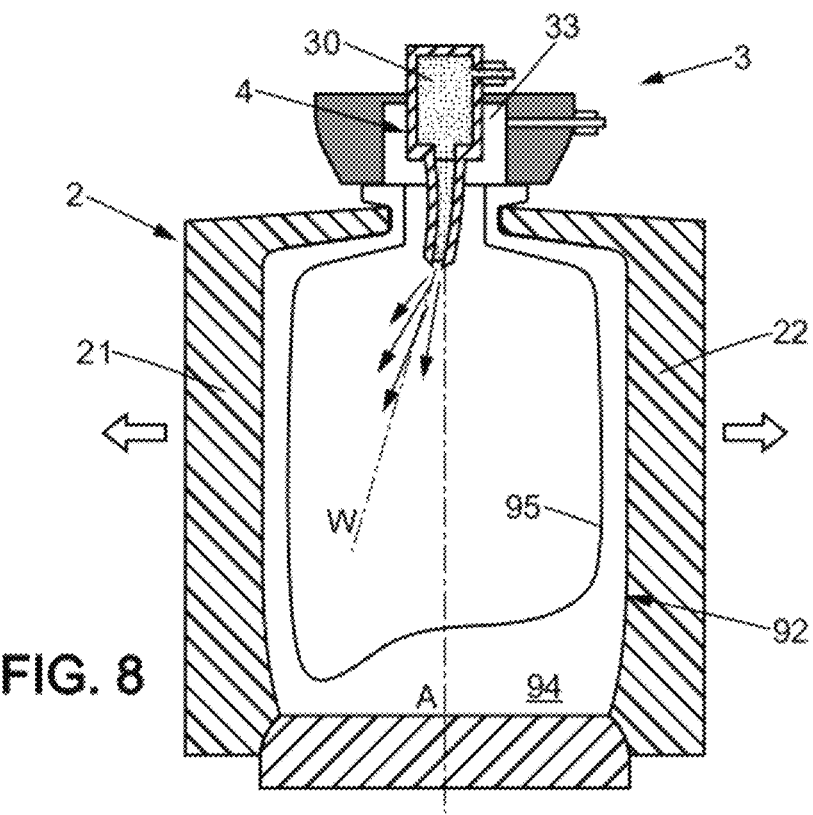
FIG. 8 is similar to FIG. 7, but after the blowing sequence and before the mold is opened.

FIGS. 7 and 8 illustrate the use of the method to form a bottle having a highly asymmetrical interior volume 95, for example in the form of a comma in the example shown. In this example, the axis of the outlet port is off-axis; the gas ejection occurs in direction W which is away from the main direction of the axis A. This pushes the glass more on the left side of the diagram while conversely the pushing is minimized on the right side, encouraging a greater thickness of the glass 92 on the right at the bottom of the bottle.

FIGS. 7 and 8 also illustrate an alternative mechanical configuration of the blowing head, wherein the blowing head fits flatly against the front face of the ring of the blank (without an internal or external centering flange).

Figure 9A:
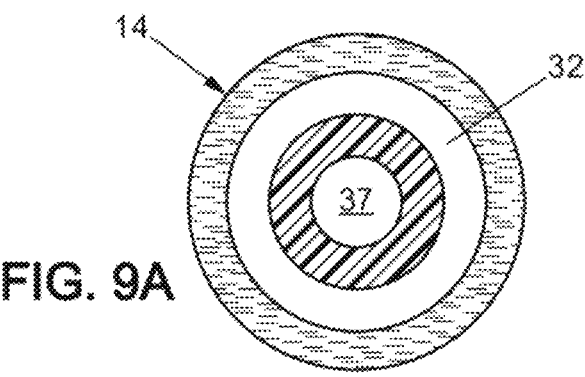
FIGS. 9A, 9B, 9C, and 9D illustrate various section views of the pipette of the blowing head.

FIG. 9A shows that the vent passage 32 is arranged as a ring around the injection path and its feed channel 37.

Figure 9B:
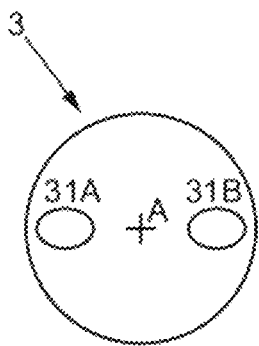

FIG. 9B shows a variant of the lower end of the pipette, wherein two outlet ports 31A, 31B are provided, one on either side of the main axis; this configuration is particularly advantageous for bottles of generally rectangular shape such as the one illustrated in FIG. 10, each port having an oval shape.

Figure 9C:
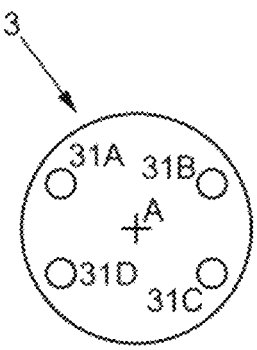

In FIG. 9C, a variant of the lower end of the pipette is shown wherein four outlet ports 31A-31D are provided to either side of the main axis, each port having a round shape.

Figure 9D:
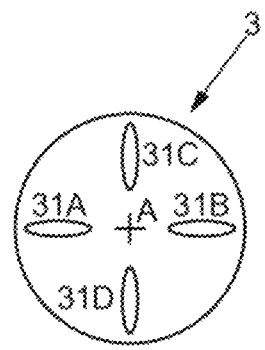

In FIG. 9D, another variant of the lower end of the pipette is shown, with four outlet ports having a slot shape.

FIG. 10 is a virtual illustration in a single diagram of three types of interior distribution, with a teardrop shape 95a, a wavy shape 95b, and a comma shape 95c.

Figure 11:
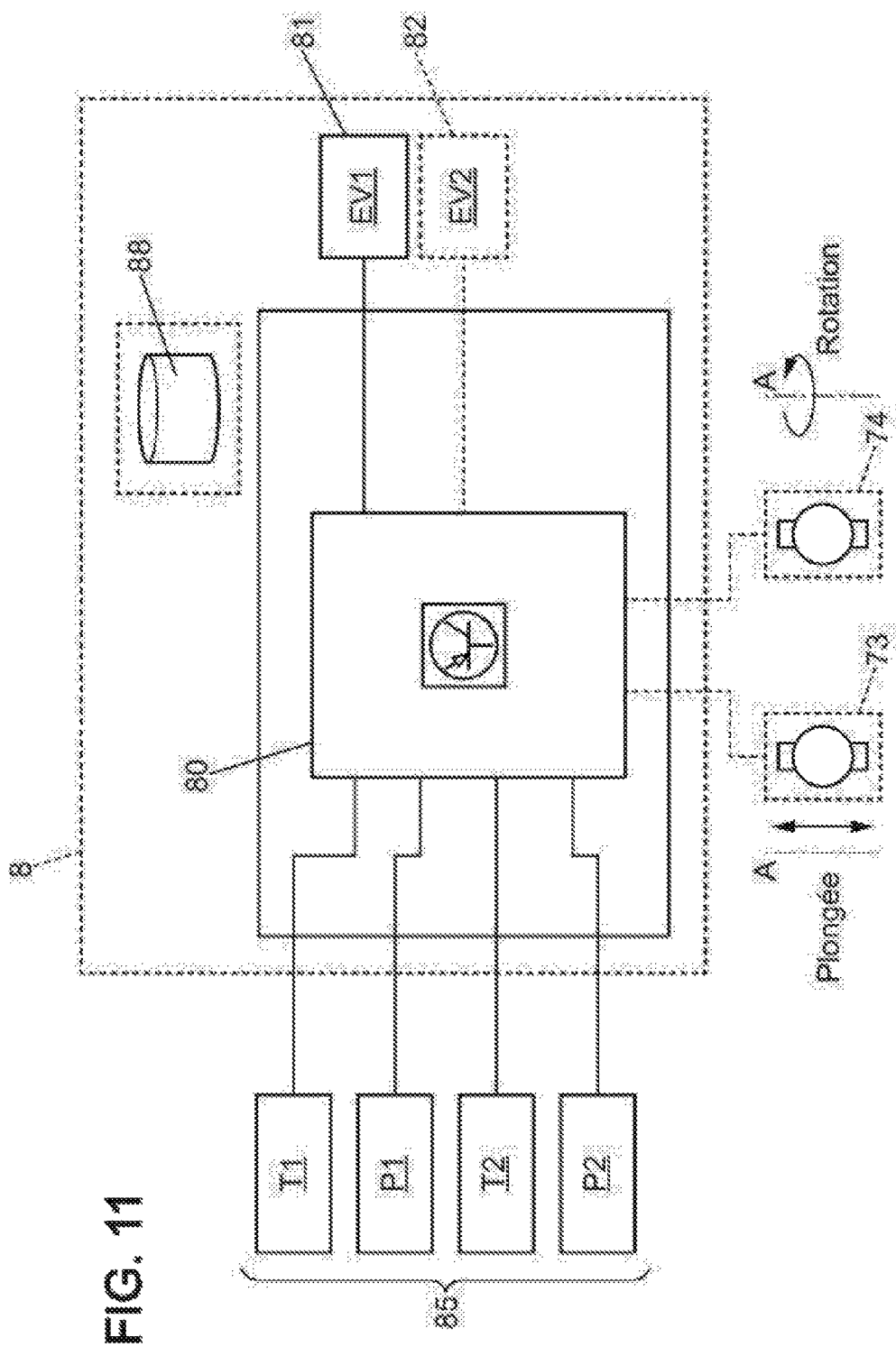
FIG. 11 shows a diagram of an electro-pneumatic control unit.

FIG. 11 shows a functional diagram with the electro-pneumatic control unit 8, with the different sensors 85 as input, namely the first temperature sensor T1, the first pressure sensor P1, the second temperature sensor T2, and the second pressure sensor P2.

The electro-pneumatic control unit 8 comprises a microprocessor 80 or an industrial programmable logic controller, or more generally any type of calculation unit. The electro-pneumatic control unit 8 controls the coil EV1 of the first solenoid valve 81, and if present the coil EV2 of the second solenoid valve 82.

In addition, the electro-pneumatic control unit 8 also controls an actuator 73 configured to move the pipette downward, which corresponds to the insertion movement, as well as the reverse movement. In addition, the electro-pneumatic control unit 8 also controls a second actuator 74 configured to rotate the pipette about the main axis A.

According to one possible option, the pipette may be mounted to move in translation along the axis A, relative to the blowing head. This can be done by means of guide posts and an actuating cylinder or by a rack-screw mechanism.

According to one possible option, means may be provided for moving at least one outlet port. In particular, means may be provided for moving the pipette relative to the rest of the blowing head, in translation and/or in rotation.

According to one option, the pipette may be mounted to move in translation along the axis A, relative to the blowing head. This can be done by means of guide posts and an actuating cylinder or by a rack-screw mechanism.

According to one option, the pipette may be mounted to rotate relative to the blowing head about the axis A. This can be done by means of a rotary bearing connection combined with a motorization based on gearing and a toothed bushing, or a cylinder acting on the pipette through a connecting rod.

Figure 12:
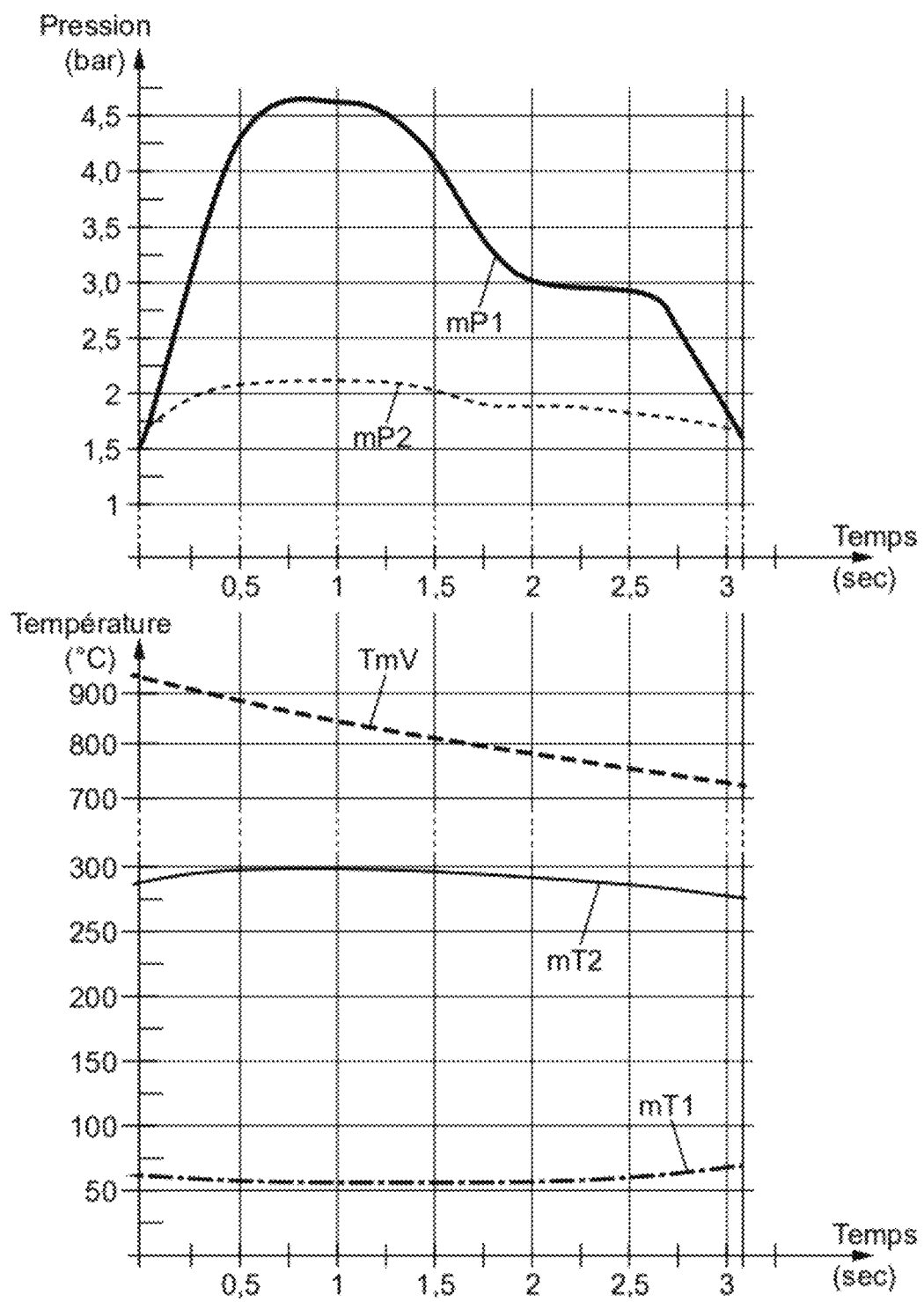
FIG. 12 illustrates a timing diagram with the pressures and temperatures observed during a blowing sequence, FIG. 13 schematically illustrates a variant of the blowing head in a simplified version.

FIG. 12 illustrates a timing diagram with the pressures and temperatures read during a blowing sequence.

For a bottle of conventional volume such as 50 ml, the blowing time may be between 2 sec to 10 sec, preferably 3 sec to 4 sec.

In the illustrated example, the blowing sequence lasts a little more than three seconds. In the illustrated example, the vent channel C2 is provided with a restrictor that is 4 mm in diameter.

The first pressure mP1 represents a pressure measured in the buffer chamber of the injection channel. The solenoid valve 81 transitions from a closed state to an open state corresponding to pressurization (for approximately 500 milliseconds) to the desired setpoint pressure, around 4.5 bar, and this lasts about 1.5 seconds as can be seen in the solid curve labeled mP1, after which the solenoid valve 81 is controlled in proportional mode to lower the pressure mP1 to a plateau at about 3 bar, again for about 1.5 seconds, after which the solenoid valve is closed once again, until the pressure measurement mP1 substantially reaches the pressure of 1.5 bar.

The curve of the measurement of the second pressure mP2 corresponds to the pressure measured on the vent channel C2. In the illustrated example, there is no second control solenoid valve 82, simply a vent restrictor. The second pressure mP2 at the vent indeed proves to be relatively proportional to the first pressure mP1 for the duration of the blowing.

During this time, the temperatures change as follows: the temperature measured at inlet mT1 first drops slightly at about 50° C., then increases during the phase where the solenoid valve 81 is closed once again (end of blowing sequence) because the flow rate and velocity are reduced and the air in the buffer chamber 30 is then heated by the pipette and the blowing head. The exiting air, labeled mT2, is much warmer because it has been heated by its passage through the cavity where the glass is at a temperature between 250° C. and 300° C. depending on the moment in the blowing process and the grade of glass being worked.

As illustrated in FIG. 12, an average reference temperature measured in the glass TmV illustrates the temperature decrease during blowing, starting from greater than 900° C. and ending at slightly greater than 700° C.

The inventors were able to determine invariants formed by [nozzle, vent] pairs, these data being stored in a database 88 that is either integrated into the control unit or is remote.

Note that the solenoid valves 81,82 are preferably proportional; it is not excluded, however, to have on-off solenoid valves.

The electro-pneumatic control unit 8 may include a database 88 containing properties of glass articles already formed by the proposed method.

Figure 13:
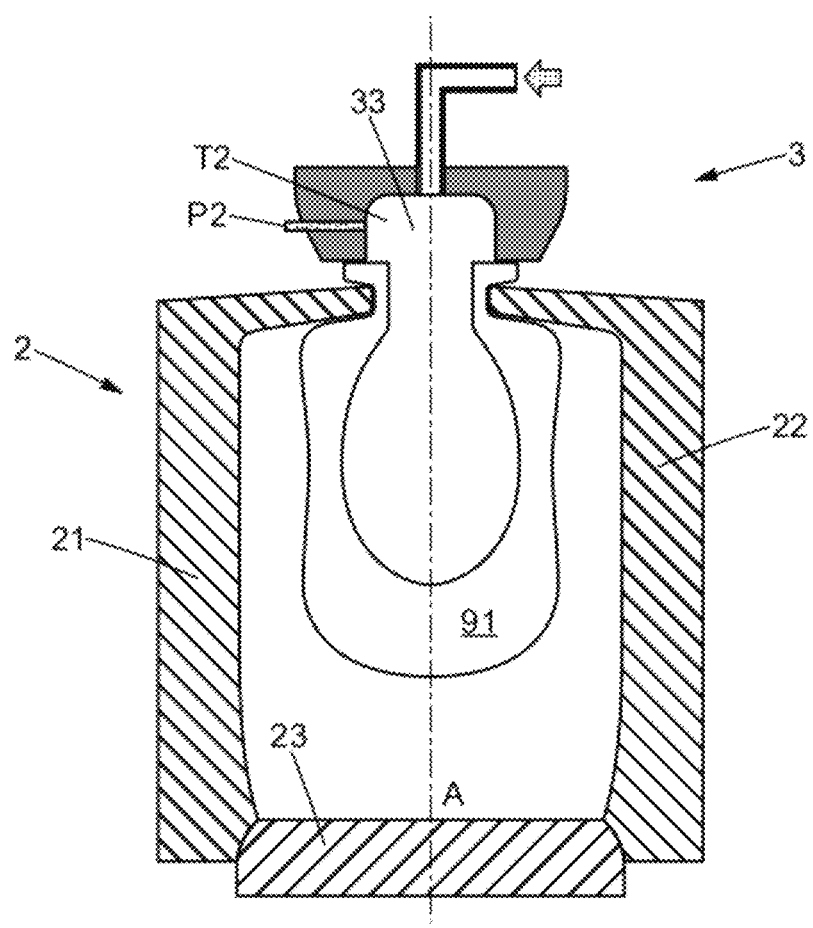

As illustrated in FIG. 13, it is possible to use a simplified blowing head with no nozzle, in a closed configuration with no vent but with a pressure sensor P2 (no P1 here) and a temperature sensor T2 (no T1 here).

The pressure measurement P2 and the control of the first control solenoid valve 81 make it possible to know the blowing pressure in the blank at any moment and to better control the pushing of the glass towards the walls of the forming mold; in this manner, spreading between neighboring molds can be avoided.

The invention claimed is:

1. A device for forming a glass article, comprising:
a forming mold for receiving a glass blank, defining a blank cavity therein and having a mouth having a main axis, where said glass blank is intended to become the glass article;
a gas injection device with a blowing head configured for propelling gas into the blank cavity, and configured to be received in the mouth of the blank, the gas injection device comprising an air circuit,
the air circuit comprising:
a pressurized gas inlet,
an injection channel connecting the pressurized gas inlet to at least one outlet nozzle to be placed inside the blank cavity, through a first control valve, and
a vent channel connecting the blank cavity to an atmospheric outlet,
and the blowing head comprising a pair of upstream sensors, the pair of upstream sensors comprising an upstream pressure sensor (P1) and an upstream temperature sensor (T1), both said upstream sensor (P1) and said upstream temperature sensor (T1) arranged on the injection channel inside the blowing head; and
an electro-pneumatic control unit configured to control the first control valve according to pressure measurements read by the upstream pressure sensor (P1) and temperature measurements read by the upstream temperature sensor (T1), so that the device controls the first control valve according to aeraulic conditions of a flow of gas blown into the blank cavity and predetermined aeraulic criteria.

2. The device according to claim 1, further comprising:
a second pair of sensors, comprising a downstream pressure sensor (P2) and a downstream temperature sensor (T2) arranged on the vent channel,
wherein the electro-pneumatic control unit is further configured to control the first control valve according to pressure measurements read by both the upstream and downstream pressure sensors and temperature measurements read by both the upstream and downstream temperature sensors.

3. The device according to claim 2, wherein a downstream buffer cavity in the vent channel is provided in the blowing head, at a location where information from the downstream pressure sensor (P2) and the downstream temperature sensor (T2) is captured.

4. The device according to claim 1, wherein an inlet buffer cavity is provided along the injection channel, in the blowing head, at a location where information from the upstream pressure sensor (P1) and the upstream temperature sensor (T1) is captured.

5. The device according to claim 1, wherein the first control valve is a solenoid valve controlled as a function of the predetermined aeraulic criteria and also as a function of time, in order to obtain a particular desired internal shape for the glass article being formed.

6. The device according to claim 1, wherein the vent channel comprises, between the blank cavity and outside air, a restrictor forming a predefined pressure drop.

7. The device according to claim 1, wherein the vent channel comprises a second control valve, between the blank cavity and outside air.

8. The device according to claim 1, wherein the at least one outlet nozzle comprises at least one off-axis outlet port, with at least one jet axis directed away from the main axis.

9. The device according to claim 1, wherein the blowing head comprises a pipette in which the at least one outlet nozzle is arranged.

10. The device according to claim 9, wherein the pipette is movable in translation along the main axis.

11. The device according to claim 9, wherein a plurality of outlet ports are provided at a lower end of the pipette.

12. A method for forming a glass article starting with a blank intended to become the glass article, the method comprising the steps of:
providing a forming device for forming the glass article, the forming device including
a forming mold for receiving the glass blank, the glass blank defining an inside cavity and having a mouth with a main axis,
a gas injection device with a blowing head configured for propelling gas into the inside cavity, and configured to be received in the mouth of the blank, the gas injection device comprising an air circuit,
the air circuit comprising
a pressurized gas inlet,
an injection channel connecting the pressurized gas inlet to at least one outlet nozzle to be placed inside the inside cavity, through a first control valve, and
a vent channel connecting the inside cavity to an atmospheric outlet, and the blowing head comprising a pair of upstream sensors, the pair of upstream sensors comprising an upstream pressure sensor (P1) and an upstream temperature sensor (T1), both said upstream sensor (P1) and said upstream temperature sensor (T1) arranged on the injection channel inside the blowing head, and
an electro-pneumatic control unit;
injecting into the inside cavity of the blank, via the first control valve, pressurized gas via the injection channel connecting the pressurized gas inlet to the at least one outlet nozzle in the inside cavity of the blank;
simultaneously measuring a first pressure and a first temperature on the air circuit between the first control valve and the outlet to outside air, by way of the upstream pressure sensor (P1) and the upstream temperature sensor (T1); and
controlling, via the electro-pneumatic control unit, the first control valve according to pressure measurements read by the upstream pressure sensor (P1) and temperature measurements read by the upstream temperature sensor (T1), so that the first control valve is controlled according to aeraulic conditions of a flow of the gas injected into the inside cavity and predetermined aeraulic criteria.

13. The method according to claim 12, wherein:
a second pressure and a second temperature prevailing in the vent channel are simultaneously measured by a second pressure sensor and a second temperature sensor, respectively, and
the first control valve is controlled according to the pressure measurements read by the upstream and second pressure sensors and the temperature measurements read by the upstream and second temperature sensors.

14. A device for forming a glass article, comprising:
a forming mold for receiving a glass blank defining a blank cavity therein and having a mouth having a main axis, said glass blank intended to become the glass article;
a gas injection device with a blowing head configured for propelling gas into the blank cavity, and configured to be received in the mouth of the blank, the gas injection device comprising an air circuit,
the air circuit comprising
a pressurized gas inlet,
an injection channel connecting the pressurized gas inlet to at least one outlet nozzle to be placed inside the blank cavity, through a first control valve, and
a vent channel connecting the blank cavity to an atmospheric outlet,
and the blowing head comprising a pair of downstream sensors, the pair of downstream sensors comprising a downstream pressure sensor (P2) and a downstream temperature sensor (T2), both said downstream pressure sensor (P2) and said downstream temperature sensor (T2) arranged on the vent channel inside the blowing head; and
an electro-pneumatic control unit configured to control the first control valve according to pressure measurements read by the downstream pressure sensor (P2) and temperature measurements read by the downstream temperature sensor (T2), so that the device controls the first control valve according to aeraulic conditions of a flow of gas blown into the blank cavity and predetermined aeraulic criteria.

15. The device according to claim 14, further comprising:
a second pair of sensors, comprising an upstream pressure sensor (P1) and an upstream temperature sensor (T1) arranged on the injection channel, wherein the electro-pneumatic control unit is configured to control the first control valve according to pressure measurements read by both the upstream and downstream pressure sensors (P1, P2) and temperature measurements read by both the upstream and downstream temperature sensors (T1, T2).

16. The device according to claim 14, wherein a downstream buffer cavity in the vent channel (C2) is provided in the blowing head, at a location where information from the first pressure sensor (P2) and the first temperature sensor (T2) is captured.

17. The device according to claim 14, wherein the first control valve is a solenoid valve controlled as a function of the predetermined aeraulic criteria and also as a function of time, in order to obtain a particular desired internal shape for the glass article being formed.

18. The device according to claim 14, wherein the vent channel comprises, between the blank cavity and outside air, a restrictor forming a predefined pressure drop.

19. The device according to claim 14, wherein the vent channel comprises a second control valve, between the blank cavity and outside air.

20. The device according to claim 14, wherein the at least one outlet nozzle comprises at least an off-axis outlet port with at least one jet axis directed away from the main axis.

21. The device according to claim 14, wherein the blowing head comprises a pipette in which at least one pressurized gas outlet port is arranged.

22. The device according to claim 21, wherein the pipette is movable in translation along the main axis.

* * * * *